(12) United States Patent
Rankin, Jr. et al.

(10) Patent No.: US 7,148,937 B2
(45) Date of Patent: Dec. 12, 2006

(54) DISPLAY COMPRISING BLENDED MIXTURE OF DIFFERENT UNIFORM DOMAIN SIZES WITH THE RATIO OF SMALLEST TO LARGEST DOMAIN SIZE NO MORE THAN 1:2

(75) Inventors: Charles M. Rankin, Jr., Penfield, NY (US); Erica N. Montbach, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 21 days.

(21) Appl. No.: 10/851,727

(22) Filed: May 21, 2004

(65) Prior Publication Data

US 2005/0259196 A1    Nov. 24, 2005

(51) Int. Cl.
*G02F 1/1333*    (2006.01)

(52) U.S. Cl. ............................. 349/90; 349/86; 349/87; 349/88; 349/89

(58) Field of Classification Search .................. 349/89, 349/90, 86, 87, 88
See application file for complete search history.

(56) References Cited

U.S. PATENT DOCUMENTS

| | | | |
|---|---|---|---|
| 3,578,844 A | 5/1971 | Churchill et al. | |
| 3,600,060 A | 8/1971 | Kettering et al. | |
| 3,642,908 A | 2/1972 | Burness et al. | |
| 4,673,255 A | 6/1987 | West et al. | |
| 5,208,686 A * | 5/1993 | Fergason .................. | 349/79 |
| 5,211,876 A | 5/1993 | Vaz et al. | |
| 5,469,278 A * | 11/1995 | Takahara et al. ........... | 349/86 |
| 5,757,448 A * | 5/1998 | Takei ......................... | 349/92 |
| 5,834,174 A * | 11/1998 | Smith et al. ............... | 430/537 |
| 6,061,107 A | 5/2000 | Yang et al. | |
| 6,407,783 B1* | 6/2002 | Ohgawara et al. ......... | 349/110 |
| 6,423,368 B1 | 7/2002 | Stephenson et al. | |
| 6,562,891 B1 | 5/2003 | Tsung-Yen et al. | |
| 6,704,073 B1* | 3/2004 | Stephenson et al. ....... | 349/86 |
| 2004/0001915 A1 | 1/2004 | Xiao-Ming et al. | |
| 2004/0091642 A1* | 5/2004 | Murakami et al. ......... | 428/1.31 |
| 2004/0260016 A1* | 12/2004 | Louwet et al. ............. | 524/817 |

FOREIGN PATENT DOCUMENTS

| | | |
|---|---|---|
| EP | 1 115 026 | 7/2001 |
| WO | 97-04398 | 2/1997 |

* cited by examiner

*Primary Examiner*—Andrew Schechter
*Assistant Examiner*—(Nancy) Thanh-Nhan P Nguyen
(74) *Attorney, Agent, or Firm*—Lynne M. Blank (57) ABSTRACT

The present invention relates to an electro-optical imaging layer, a display utilizing the imaging layer and a method for making the same comprising a binder having dispersed therein at least two electrically modulated material domains of different uniform sizes, wherein the ratio of smallest to largest domain size for each of the electrically modulated material domains of different uniform sizes varies by no more than 1:2.

53 Claims, 2 Drawing Sheets

(PRIOR ART)

FIG. 4

DISPLAY COMPRISING BLENDED MIXTURE OF DIFFERENT UNIFORM DOMAIN SIZES WITH THE RATIO OF SMALLEST TO LARGEST DOMAIN SIZE NO MORE THAN 1:2

FIELD OF THE INVENTION

The present invention relates to electrically modulated imaging materials coated so as to provide multiple uniform domain sizes that increase the packing density and the overall brightness of the display.

BACKGROUND OF THE INVENTION

Currently, information is displayed on sheets using permanent inks or displayed on electronically modulated surfaces such as cathode ray displays or liquid crystal displays. Other sheet materials can carry magnetically writable areas to carry ticketing or financial information. Magnetically written data, however, is not visible.

World patent application PCT/WO 97/04398, entitled "Electronic Book With Multiple Display Pages", is a thorough recitation of the art of thin, electronically written sheet display technologies. Disclosed is the assembling of multiple display sheets that are bound into a "book", each sheet provided with means to individually address each page. The patent recites prior art in forming thin, electronically written pages, including flexible sheets, image modulating material formed from a bistable liquid crystal system, and thin metallic conductor lines on each page.

An early patent, U.S. Pat. No. 3,578,844, discloses a light modulating structure for a display device. In the patent, cholesteric liquid crystal material is encapsulated by light penetrable gelatin and gum arabic capsules that are coated on a screen. The capsules were formed by emulsifying the cholesteric material in a gelatin solution using a blender to form droplets between 10 and 30 microns in diameter. The pH of the emulsion was changed to precipitate a gelatin coating over each droplet of cholesteric material. The gelatin was hardened and the capsules sieved from the solution. The capsules are then coated over a field-carrying surface that is in contact with heating elements to provide an electrically switchable image that must be heated to isotropic to erasure written images.

U.S. Pat. No. 3,600,060 to Churchill et al. discloses another process for providing cholesteric liquid crystals in a polymer matrix. The patent discloses emulsifying droplets of liquid crystal in a solution having a dissolved film forming polymer. The patent further discloses coatings or films having droplets of cholesteric liquid crystal material between 1 and 50 microns in diameter. Suitable binders mentioned in the paper include gelatin, gum arabic, and other water soluble polymers. Churchill et al. disclose the emulsion can be coated on a substrate, for example, by means of a draw down applicator to a wet thickness of about 10 mils and air dried at about 25° C. Churchill et al. state that the layers can be dried to touch. This technique of emulsifying droplets of liquid crystal in a solution allows for droplets with a large variation in diameter and will not allow for multiple well controlled droplet sizes. This creates large domains and smaller parasitic domains. Parasitic domains have reduced optical characteristics compared to optimized larger domains.

Another technique for providing liquid crystal domains in a coating is disclosed as prior art in U.S. Pat. No. 4,673,255. A miscible mixture of liquid crystal and polymer are combined. Phase separation is accomplished by curing or polymerizing a solution of resin and liquid crystal; by cooling a solution of liquid crystal and thermoplastic resin heated to a temperature sufficient to dissolve the liquid crystal; or by evaporating a solvent in which the polymer and liquid crystal are mutually soluble. The resin polymer is phase separated from the liquid crystal to form microdroplets of the liquid crystal in a polymeric matrix. The step of controlling the rate of microdroplet growth can be carried out by controlling the rate of cooling of a homogeneous solution of liquid crystal and thermoplastic polymer heated to a temperature sufficient to dissolve the liquid crystal. The phase separation can be thermally induced, solvent induced or polymerization induced to create domains of liquid crystal. This method allows for microdroplet growth so that the microdroplets have a selected average diameter when phase separation is complete. This method cannot be implemented to improve packing density and the overall brightness of the display since it will not allow for multiple precisely controlled droplet sizes. This method is predominately used with nematic liquid crystals.

U.S. Pat. No. 6,423,368 to Stephenson et al. discloses dispersing a liquid crystal material in an aqueous bath containing a water soluble binder material such as gelatin, along with a quantity of colloidal particles wherein the colloidal particles limit coalescence. The limited coalescent materials were coated over a substrate and dried, wherein the coated material formed a set of uniform limited coalescence domains having a plurality of electrically responsive optical states. The limited coalescence method allows the production of material with uniform sized domains or droplets of liquid crystalline material. However, the final coating has droplets of approximately all the same size, which can limit packing density, resulting in non-optimized reflectance and an increase in surface roughness.

U.S. Pat. No. 6,061,107 discloses that controlling the shape of domains of liquid crystal material in a polymer binder can improve light scattering properties. The patent discloses the use of temperature, solvent and polymer induced phase separation techniques to provide domains of liquid crystal that have a major and minor axis, where the major axis is larger in size than the cell thickness. When solvents are used, there may be significant environmental concerns. U.S. Pat. No. 6,061,107 also discloses liquid crystal material having monomers in solution that are polymerized to form polymer dispersed liquid crystals. This method does not allow for multiple well controlled droplet sizes in one simultaneous coating.

U.S. Pat. No. 6,704,073 to Stephenson et al. discloses the coating of polymer-dispersed liquid crystals comprising the steps of providing an emulsion having cholesteric liquid crystal material in a gelatin solution, heating the emulsion to reduce the viscosity of the emulsion, coating the heated emulsion on a substrate, lowering the temperature of the coated emulsion to change the state of the coated emulsion from a liquid to a gel state, thereby forming a coating characterized by a corresponding increased viscosity state, and drying the coating, while maintaining it in the high viscosity state, to form a coating in which domains of polymer dispersed cholesteric liquid crystals are dispersed in a gelatin-containing matrix. However, the final coating has droplets of approximately all the same size, which can limit packing density, resulting in non-optimized reflectance and an increase in surface roughness.

Problem to be Solved

There remains a need for a display comprising an electrically modulated imaging material that has the optimal overall brightness along with lower surface roughness while maintaining as thin a layer as possible.

SUMMARY OF THE INVENTION

The present invention relates to an electro-optical imaging layer, a display utilizing the imaging layer and a method for making the same comprising a binder having dispersed therein at least two electrically modulated material domains of different uniform sizes, wherein the ratio of smallest to largest domain size for each of the electrically modulated material domains of different uniform sizes varies by no more than 1:2.

ADVANTAGEOUS EFFECT OF THE INVENTION

The present invention includes several advantages, not all of which are incorporated in a single embodiment. By having the electrically modulated imaging material contained in droplets or domain of more than one size, it has been demonstrated that the effective brightness of the display increases along with decreased surface roughness of the coating. For the case where the display material is cholesteric liquid crystal, this display is still bistable and able to be switched into both the focal conic and planar states. Other advantages may include increased off axis viewing angle response, and the ability to mix multiple domain sizes with varying optical properties.

DETAILED DESCRIPTION OF THE INVENTION

The present invention relates to a display with an imaging layer comprising a binder having dispersed therein at least two electrically modulated material domains of different uniform sizes, wherein the ratio of smallest to largest domain size for each of said electrically modulated material domains of different uniform sizes varies by no more than 1:2.

The electro-optical imaging layer 30 contains electrically modulated material domains dispersed in a binder. For purposes of the present invention domains are defined to be synonymous with micelles and/or droplets. The electrically modulated material may be electrochromic material, rotatable microencapsulated microspheres, polymer dispersed liquid crystals (PDLC), polymer stabilized liquid crystals, surface stabilized liquid crystals, smectic liquid crystals, ferroelectric material, electroluminescent material or any other of a very large number of electro-optical imaging materials known in the prior art. The domains of the electrically modulated imaging layer include more than one uniform domain size, with few, if any, parasitic domains, which are sets of domains with random or uncontrolled sizes and which have undesirable electro-optical properties, within the dried coatings, as described in previous patent art.

Although the brightness provided by the one uniform domain size is acceptable, it has been found that having more than one well-defined domain size increases the overall brightness by increasing the covering power in the display. With only one selected average diameter there are locations where there is an absence of domains. In a typical embodiment of the present invention, there will be a larger domain size and at least one smaller domain size. However, the smaller domain size will still be large enough so that it does not qualify as a parasitic domain and will have a selected, controlled and uniform average diameter, just as the larger domains do. With the addition of more then one selected average diameter, there are very few locations where there is an absence of domains. The mixture is dispersed to provide domains having an average diameter of at least 2 microns in the as-applied (dried) state.

With only one selected average diameter, the roughness of the coating increases as the diameter of the domain increases. The increased coating roughness will be transferred to the conductive layer that is coated above the dispersion. When the conductive layer's roughness is increased, its resistivity also increases which results in a less effective conductive layer. With the addition of more than one selected average diameter, the roughness of the coating decreases in an unexpected non-linear fashion resulting in a reduced resistivity conductive layer that is more effective. Also, the reduced roughness coating has less scatter due to the more uniform coating.

The size ranges of domains in the dried coating are varied as the mixture dries and the domains flatten. In one embodiment, the resulting domains are flattened by the drying process and have on average a thickness substantially less than their length. The flattening of the domains can be achieved by proper formulation and sufficiently rapid drying of the coating.

Preferably, the domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating. The domains preferably have an average diameter of 2 to 30 microns. The imaging layer preferably has a thickness of 10 to 150 microns when first coated and 2 to 20 microns when dried.

The flattened domains of liquid crystal material can be defined as having a major axis and a minor axis. In a preferred embodiment of a display or display sheet, the major axis is larger in size than the cell (or imaging layer) thickness for a majority of the domains. Such a dimensional relationship is shown in U.S. Pat. No. 6,061,107, hereby incorporated by reference in its entirety.

Figure 1:
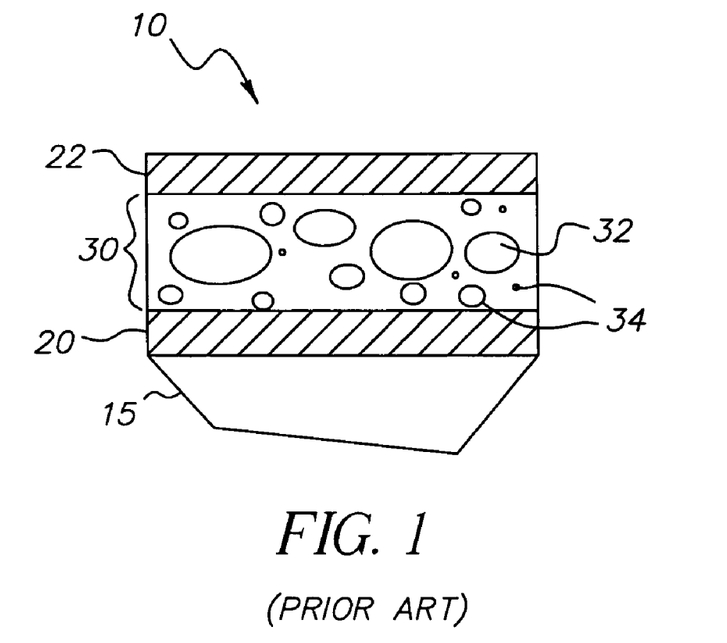
FIG. 1 is a sectional view of a portion of a sheet supporting a polymer dispersed electrically modulated material, illustrative of conventional dispersion methods.

In U.S. Pat. No. 3,600,060, incorporated herein by reference, the domains of the dried light-modulating material had particle size varying in diameter by a ratio of 10:1. This creates large domains and smaller parasitic domains, as shown in FIG. 1. Parasitic domains created domains have reduced characteristics when compared with optimized larger domains. The reduced characteristics include reduced brightness and if the parasitic domains are small enough diminished bistability of the cholesteric liquid crystal.

Figure 2:
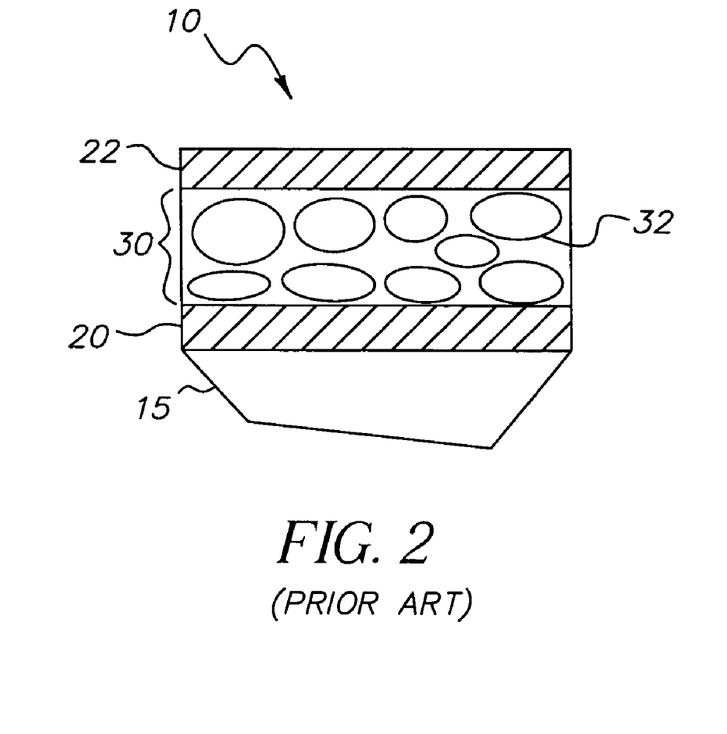
FIG. 2 is a sectional view of a sheet showing uniform domains according to the present invention.

FIG. 2 is a sectional view of sheet 10 showing domains 32 of a limited coalescent material which have maintained their uniform size after the addition of the surfactant and after being machine coated, similar to U.S. Pat. No. 6,423,368. There were few, if any, parasitic domains 34 (having undesirable electro-optical properties) within the dried coatings, as described in previous art.

The patents mentioning limited coalescence for uniform droplet domain sizes examine the advantages of having one uniform domain size. Although the brightness provided by the one uniform domain size is acceptable, it has been found that having more than one well defined domain size increases the overall brightness by increasing the covering power in the display.

Figure 3:
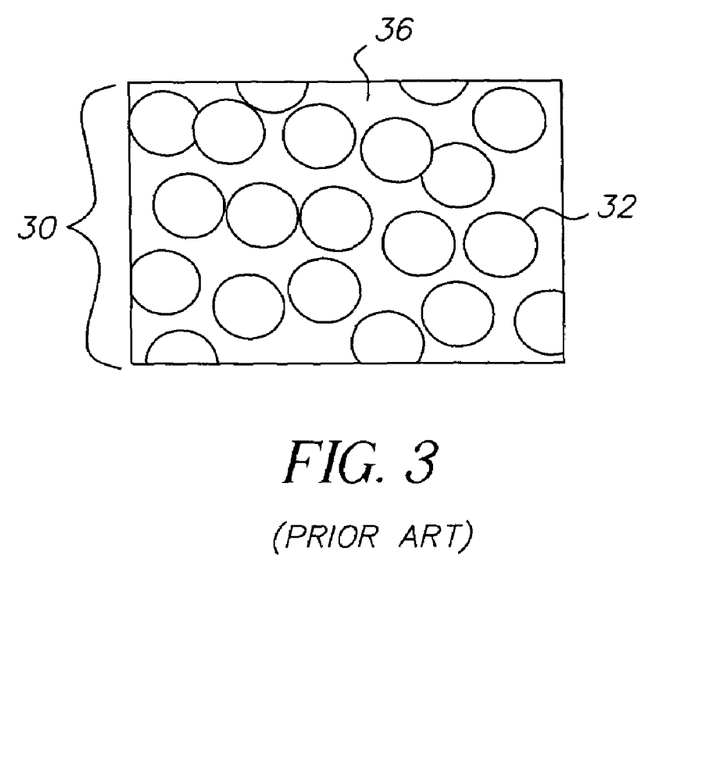
FIG. 3 is a top view of an electro-optical imaging layer illustrating that, with only one selected average diameter domain, there are locations where there is an absence of domains.

FIG. 3 is a top view of the electro-optical imaging layer 30 showing binder 36 with domains 32 of a limited coalescent material which have maintained their uniform size after the addition of the surfactant and after being machine coated. With only one selected average diameter there are locations where there is an absence of domains.

Figure 4:
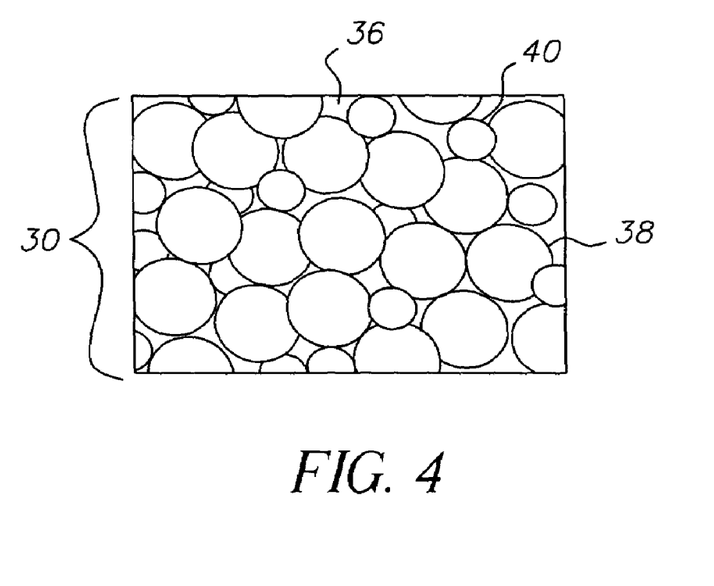
FIG. 4 is a top view of the electro-optical imaging layer for use with the present invention with two uniform domain sizes.

FIG. 4 is a top view of the electro-optical imaging layer 30 with two domain sizes from two separate emulsions. Of the different domains there will be a larger domain size 38 and at least one smaller domain size 40. However, the smaller domain size will still be large enough so that it does not qualify as a parasitic domain and the smaller domain size will have a selected average diameter just as the larger domains do. With the addition of more then one selected average diameter there are very few locations where there is an absence of domains.

The dispersed domains have an average diameter of 2 to 30 microns, preferably 5 to 15 microns, more preferably about 6 microns for one domain and less then about 10 microns for a second or more domain. The domains are dispersed in an aqueous suspension. The size ranges for the dried coating are varied as the mixture dries and the domains flatten.

It has also been demonstrated that, in the case of chiral nematic liquid crystalline imaging layers, combining domain sizes greater than six microns has a most beneficial response not only in the brightness of the display but also in decreased roughness of the coating. Preferably, the ratio of smallest to largest domain size in one emulsion varies by approximately 1:2. By varying the amount of silica and copolymer relative to the liquid crystalline material, uniform domain size emulsions of the desired average diameter (by microscopy), for example, 3 or 8 micron, can be produced. This process produces domains of a selected average diameter. Either before or during the coating process, 2 or more emulsions consisting of domains with different selected average diameters are blended together, resulting in a coating with improved packing density and display characteristics.

The resulting domains are flattened by the drying process and have on average a thickness substantially less than their length, preferably at least 50% less. More preferably, the domains on average have a thickness (depth) to length ratio of 1:2 to 1:10. Domains from the one emulsion will have a higher thickness to length ratio then the additional emulsions in the coating. Preferably, one set of domains will have a thickness to length ratio of 1:6 to 1:10 and the additional emulsions will have a thickness to length ratio that is reduced. The flattening of the domains can be achieved by proper formulation and sufficiently rapid drying of the coating.

The display includes a suitable material electrically modulated material disposed on a suitable support structure, such as on or between one or more electrodes. The term "electrically modulated material" as used herein is intended to include any suitable nonvolatile material. Suitable materials for the electrically modulated material are described in U.S. patent application Ser. No. 09/393,553 and U.S. Provisional Patent Application Ser. No. 60/099,888, the contents of both applications are herein incorporated by reference.

The electrically modulated material may also be a printable, conductive ink having an arrangement of particles or microscopic containers or microcapsules. Each microcapsule contains an electrophoretic composition of a fluid, such as a dielectric or emulsion fluid, and a suspension of colored or charged particles or colloidal material. The diameter of the microcapsules typically ranges from about 30 to about 300 microns. According to one practice, the particles visually contrast with the dielectric fluid. According to another example, the electrically modulated material may include rotatable balls that can rotate to expose a different colored surface area, and which can migrate between a forward viewing position and/or a rear nonviewing position, such as gyricon. Specifically, gyricon is a material comprised of twisting rotating elements contained in liquid filled spherical cavities and embedded in an elastomer medium. The rotating elements may be made to exhibit changes in optical properties by the imposition of an external electric field. Upon application of an electric field of a given polarity, one segment of a rotating element rotates toward, and is visible by an observer of the display. Application of an electric field of opposite polarity, causes the element to rotate and expose a second, different segment to the observer. A gyricon display maintains a given configuration until an electric field is actively applied to the display assembly. Gyricon particles typically have a diameter of about 100 microns. Gyricon materials are disclosed in U.S. Pat. No. 6,147,791, U.S. Pat. No. 4,126,854 and U.S. Pat. No. 6,055,091, the contents of which are herein incorporated by reference.

According to one practice, the microcapsules may be filled with electrically charged white particles in a black or colored dye. Examples of electrically modulated material and methods of fabricating assemblies capable of controlling or effecting the orientation of the ink suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898, the contents of which are herein incorporated by reference.

The electrically modulated material may also include material disclosed in U.S. Pat. No. 6,025,896, the contents of which are incorporated herein by reference. This material comprises charged particles in a liquid dispersion medium encapsulated in a large number of microcapsules. The charged particles can have different types of color and charge polarity. For example white positively charged particles can be employed along with black negatively charged particles. The described microcapsules are disposed between a pair of electrodes, such that a desired image is formed and displayed by the material by varying the dispersion state of the charged particles. The dispersion state of the charged particles is varied through a controlled electric field applied to the electrically modulated material. According to a preferred embodiment, the particle diameters of the microcapsules are between about 5 microns and about 200 microns, and the particle diameters of the charged particles are between about one-thousandth and one-fifth the size of the particle diameters of the microcapsules.

Further, the electrically modulated material may include a thermochromic material. A thermochromic material is capable of changing its state alternately between transparent and opaque upon the application of heat. In this manner, a thermochromic imaging material develops images through the application of heat at specific pixel locations in order to form an image. The thermochromic imaging material retains a particular image until heat is again applied to the material. Since the rewritable material is transparent, UV fluorescent printings, designs and patterns underneath can be seen through.

The electrically modulated material may also include surface stabilized ferrroelectric liquid crystals (SSFLC). Surface stabilized ferroelectric liquid crystals confining ferroelectric liquid crystal material between closely spaced glass plates to suppress the natural helix configuration of the crystals. The cells switch rapidly between two optically distinct, stable states simply by alternating the sign of an applied electric field.

Magnetic particles suspended in an emulsion comprise an additional imaging material suitable for use with the present invention. Application of a magnetic force alters pixels formed with the magnetic particles in order to create, update or change human and/or machine readable indicia. Those skilled in the art will recognize that a variety of bistable nonvolatile imaging materials are available and may be implemented in the present invention.

The electrically modulated material may also be configured as a single color, such as black, white or clear, and may be fluorescent, iridescent, bioluminescent, incandescent, ultraviolet, infrared, or may include a wavelength specific radiation absorbing or emitting material. There may be multiple layers of electrically modulated material. Different layers or regions of the electrically modulated material may have different properties or colors. Moreover, the characteristics of the various layers may be different from each other. For example, one layer can be used to view or display information in the visible light range, while a second layer responds to or emits ultraviolet light. The nonvisible layers may alternatively be constructed of nonelectrically modulated material based materials that have the previously listed radiation absorbing or emitting characteristics. The electrically modulated material employed in connection with the present invention preferably has the characteristic that it does not require power to maintain display of indicia.

The most preferred electrically modulated material is a light modulating material, such as a liquid crystalline material. The liquid crystalline material can be one of many different liquid crystal phases such as; nematic (N), chiral nematic (N*), or smectic, depending upon the arrangement of the molecules in the mesophase. Chiral nematic liquid crystal (N*LC) displays are preferably reflective, that is, no backlight is needed, and can function without the use of polarizing films or a color filter.

Chiral nematic liquid crystal refers to the type of liquid crystal having finer pitch than that of twisted nematic and super twisted nematic used in commonly encountered liquid crystal devices. Chiral nematic liquid crystals are so named because such liquid crystal formulations are commonly obtained by adding chiral agents to host nematic liquid crystals. Chiral nematic liquid crystals may be used to produce bistable or multi-stable displays. These devices have significantly reduced power consumption due to their nonvolatile "memory" characteristic. Since such displays do not require a continuous driving circuit to maintain an image, they consume significantly reduced power. Chiral nematic displays are bistable in the absence of a field, the two stable textures are the reflective planar texture and the weakly scattering focal conic texture. In the planar texture, the helical axes of the chiral nematic liquid crystal molecules are substantially perpendicular to the substrate upon which the liquid crystal is disposed. In the focal conic state the helical axes of the liquid crystal molecules are generally randomly oriented. Adjusting the concentration of chiral dopants in the chiral nematic material modulates the pitch length of the mesophase and, thus, the wavelength of radiation reflected. Chiral nematic materials that reflect infrared radiation and ultraviolet have been used for purposes of scientific study. Commercial displays are most often fabricated from chiral nematic materials that reflect visible light. Some known LCD devices include chemically etched, transparent, conductive layers overlying a glass substrate as described in U.S. Pat. No. 5,667,853, incorporated herein by reference. Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bistability and gray scale memory.

Modern chiral nematic liquid crystal materials usually include at least one nematic host combined with a chiral dopant. In general, the nematic liquid crystal phase is composed of one or more mesogenic components combined to provide useful composite properties. The nematic component of the chiral nematic liquid crystal mixture may be comprised of any suitable nematic liquid crystal mixture or composition having appropriate liquid crystal characteristics. Nematic liquid crystals suitable for use in the present invention are preferably composed of compounds of low molecular weight selected from nematic or nematogenic substances, for example from the known classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxyiic acid and of cyclohexylcyclohexanecarboxylic acid, phenyl cyclohexanes, cyclohexylbiphenyls, phenyl cyclohexylcyclohexanes, cyclohexylcyclohexanes, cyclohexylcyclohexenes, cyclohexylcyclohexylcyclohexenes, 1,4-bis-cyclohexylbenzenes, 4,4-bis-cyclohexylbiphenyls, phenyl- or cyclohexylpyrimidines, phenyl- or cyclohexylpyridines, phenyl- or cyclohexylpyridazines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2',2-biphenylethanes, 1-phenyl-2-cyclohexylphenylethanes, optionally halogenated stilbenes, benzyl phenyl ethers, tolanes, substituted cinnamic acids and esters, and further classes of nematic or nematogenic substances. The 1,4-phenylene groups in these compounds may also be laterally mono- or difluorinated. The liquid crystalline material of this preferred embodiment is based on the achiral compounds of this type. The most important compounds, that are possible as components of these liquid crystalline materials, can be characterized by the following formula R'—X—Y-Z—R" wherein X and Z, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, —B-Phe- and —B-Cyc-, wherein Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and B is 2-(trans-1,4-cyclohexyl)ethyl, pyrimidine-2,5-diyl, pyridine-2,5-diyl or 1,3-dioxane-2,5-diyl. Y in these compounds is selected from the following bivalent groups —CH=CH—, —C≡C—, —N=N(O)—, —CH=CY'—, —CH=N(O)—, —CH2—CH2—, —CO—O—, —CH2—O—, —CO—S—, —CH2—S—, —COO-Phe-COO— or a single bond, with Y' being halogen, preferably chlorine, or —CN, R' and R" are, in each case, independently of one another, alkyl, alkenyl, alkoxy, alkenyloxy, alkanoyloxy, alkoxycarbonyl or alkoxycarbonyloxy with 1 to 18, preferably 1 to 12 C atoms, or alternatively one of R' and R" is —F, —CF3, —OCF3, —Cl, —NCS or —CN. In most of these compounds R' and R' are, in each case, independently of each another, alkyl, alkenyl or alkoxy with different chain length, wherein the sum of C atoms in nematic media generally is between 2 and 9, preferably between 2 and 7. The nematic liquid crystal phases typically consist of 2 to 20, preferably 2 to 15 components. The above list of materials is not intended to be exhaustive or limiting. The lists disclose a variety of representative materials suitable for use or mixtures, which comprise the active element in electro-optic liquid crystal compositions. Chiral nematic liquid crystal materials and cells, as well as polymer stabilized chiral nematic liquid crystals and cells, are well known in the art and described in, for example, U.S. patent application Ser. No. 07/969,093, Ser. No. 08/057,662, Yang et al., Appl. Phys. Lett. 60(25) pp 3102–04 (1992), Yang et al., J. Appl. Phys. 76(2) pp 1331 (1994), published International Patent Application No. PCT/US92/09367, and published International Patent Application No. PCT/US92/03504, all of which are incorporated herein by reference.

Suitable commercial nematic liquid crystals include, for example, E7, E44, E48, E31, E80, BL087, BL101, ZLI-3308, ZLI-3273, ZLI-5048-000, ZLI-5049-100, ZLI-5100-100, ZLI-5800-000, MLC-6041-100.TL202, TL203, TL204 and TL205 manufactured by E. Merck (Darmstadt, Germany). Although nematic liquid crystals having positive dielectric anisotropy, and especially cyanobiphenyls, are preferred, virtually any nematic liquid crystal known in the art, including those having negative dielectric anisotropy should be suitable for use in the invention. Other nematic materials may also be suitable for use in the present invention as would be appreciated by those skilled in the art.

The chiral dopant added to the nematic mixture to induce the helical twisting of the mesophase, thereby allowing reflection of visible light, can be of any useful structural class. The choice of dopant depends upon several characteristics including among others its chemical compatibility with the nematic host, helical twisting power, temperature sensitivity, and light fastness. Many chiral dopant classes are known in the art: for example, G. Gottarelli and G. Spada, *Mol. Cryst. Liq. Crys.*, 123, 377 (1985), G. Spada and G. Proni, *Enantiomer*, 3, 301 (1998) and references therein. Typical well known dopant classes include 1,1-binaphthol derivatives, isosorbide and similar isomannide esters as disclosed in U.S. Pat. No. 6,217,792, TADDOL derivatives as disclosed in U.S. Pat. No. 6,099,751, and the pending spiroindanes esters as disclosed in U.S. patent application Ser. No. 10/651,692 by T. Welter et al., filed Aug. 29, 2003, titled "Chiral Compounds And Compositions Containing The Same," hereby incorporated by reference.

The pitch length of the liquid crystal materials may be adjusted based upon the following equation (1):

$$\lambda_{max} = n_{av} p_0$$

where $\lambda_{max}$ is the peak reflection wavelength, that is, the wavelength at which reflectance is a maximum, $n_{av}$ is the average index of refraction of the liquid crystal material, and $p_0$ is the natural pitch length of the chiral nematic helix. Definitions of chiral nematic helix and pitch length and methods of its measurement, are known to those skilled in the art such as can be found in the book, Blinov, L. M., Electro-optical and Magneto-Optical Properties of Liquid Crystals, John Wiley & Sons Ltd. 1983. The pitch length is modified by adjusting the concentration of the chiral material in the liquid crystal material. For most concentrations of chiral dopants, the pitch length induced by the dopant is inversely proportional to the concentration of the dopant. The proportionality constant is given by the following equation (2):

$$p_0 = 1/(HTP \cdot c)$$

where c is the concentration of the chiral dopant and HTP is the proportionality constant.

For some applications, it is desired to have liquid crystal mixtures that exhibit a strong helical twist and thereby a short pitch length. For example in liquid crystalline mixtures that are used in selectively reflecting chiral nematic displays, the pitch has to be selected such that the maximum of the wavelength reflected by the chiral nematic helix is in the range of visible light. Other possible applications are polymer films with a chiral liquid crystalline phase for optical elements, such as chiral nematic broadband polarizers, filter arrays, or chiral liquid crystalline retardation films. Among these are active and passive optical elements or color filters and liquid crystal displays, for example STN, TN, AMD-TN, temperature compensation, polymer free or polymer stabilized chiral nematic texture (PFCT, PSCT) displays. Possible display industry applications include ultralight, flexible, and inexpensive displays for notebook and desktop computers, instrument panels, video game machines, videophones, mobile phones, hand held PCs, PDAs, e-books, camcorders, satellite navigation systems, store and supermarket pricing systems, highway signs, informational displays, smart cards, toys, and other electronic devices.

The liquid crystalline droplets or domains are typically dispersed in a continuous binder. Suitable hydrophilic binders include both naturally occurring substances such as proteins, protein derivatives, cellulose derivatives (for example cellulose esters), gelatins and gelatin derivatives, polysaccaharides, casein, and the like, and synthetic water permeable colloids such as poly(vinyl lactams), acrylamide polymers, latex, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl acrylate and methacrylates, vinyl imidazole copolymers, vinyl sulfide copolymers, and homopolymer or copolymers containing styrene sulfonic acid. Gelatin is preferred.

Useful "gelatins," as that term is used generically herein, include alkali treated gelatin (cattle bone or hide gelatin), acid treated gelatin (pigskin gelatin) and gelatin derivatives such as acetylated gelatin, phthalated gelatin and the like.

Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water soluble polyvinyl compounds such as polyvinyl alcohol, polyacrylamide, poly(vinylpyrrolidone), and the like. Useful liquid crystal to gelatin ratios should be between 6:1 and 0.5:1 liquid crystal to gelatin, preferably 8:5.

Other organic binders such as polyvinyl alcohol (PVA) or polyethylene oxide (PEO) can be used as minor components of the binder in addition to gelatin. Such compounds are preferably machine coatable on equipment associated with photographic films.

It is desirable that the binder has a low ionic content. The presence of ions in such a binder hinders the development of an electrical field across the dispersed liquid crystal material. Additionally, ions in the binder can migrate in the presence of an electrical field, chemically damaging the light modulating layer. The coating thickness, size of the liquid crystal domains, and concentration of the domains of liquid crystal materials are designed for optimum optical properties. Heretofore, the dispersion of liquid crystals is performed using shear mills or other mechanical separating means to form domains of liquid crystal within light modulating layer.

A conventional surfactant can be added to the emulsion to improve coating of the layer. Surfactants can be of conventional design, and are provided at a concentration that corresponds to the critical micelle concentration (CMC) of the solution. A preferred surfactant is a mixture of the sodium salts of diisopropyl and triisopropyl naphthalene sulfonate, commercially available from DuPont, Inc. (Wilmington, Del.) as ALKANOL XC surfactant. In order to prevent the hydrophilic colloid from removing the suspension stabilizing agent from the surface of the lubricant droplets, suitable anionic surfactants may be included in the mixing step to prepare the coating composition such as polyisopropyl naphthalene-sodium sulfonate, sodium dodecyl sulfate, sodium dodecyl benzene sulfonate, as well as those anionic surfactants set forth in U.S. Pat. No. 5,326,687 and in Section XI of Research Disclosure 308119, December 1989, entitled "Photographic Silver Halide Emulsions, Preparations, Addenda, Processing, and Systems", both of which are incorporated herein by reference. Aromatic sulfonates are more preferred and polyisopropyl naphthalene sulfonate is most preferred.

In one embodiment, a chiral nematic liquid crystal composition may be dispersed in a continuous polymeric matrix. Such materials are referred to as "polymer dispersed liquid crystal" materials or "PDLC" materials. Such materials can be made by a variety of methods. For example, Doane et al. (*Applied Physics Letters,* 48, 269 (1986)) disclose a PDLC comprising approximately 0.4 µm droplets of nematic liquid crystal 5CB in a polymer binder. A phase separation method is used for preparing the PDLC. A solution containing monomer and liquid crystal is filled in a display cell and the material is then polymerized. Upon polymerization the liquid crystal becomes immiscible and nucleates to form droplets. West et al. (Applied Physics Letters 63, 1471 (1993)) disclose a PDLC comprising a chiral nematic mixture in a polymer binder. Once again a phase separation method is used for preparing the PDLC. The liquid crystal material and polymer (a hydroxy functionalized polymethylmethacrylate) along with a crosslinker for the polymer are dissolved in a common organic solvent toluene and coated on an indium tin oxide (ITO) substrate. A dispersion of the liquid crystal material in the polymer binder is formed upon evaporation of toluene at high temperature. The phase separation methods of Doane et al. and West et al. require the use of organic solvents that may be objectionable in certain manufacturing environments.

The liquid crystal and gelatin emulsion are coated and dried to a thickness of between 5 and 30 microns to optimize optical properties of light modulating layer. In one embodiment, the layer is coated to provide a final coating containing a substantial monolayer of N*LC domains. The term "substantial monolayer" is defined by the Applicants to mean that, in a direction perpendicular to the plane of the display, there is no more than a single layer of domains sandwiched between the electrodes at most points of the display (or the imaging layer).

The amount of material needed for a monolayer can be accurately determined by calculation based on individual domain size, assuming a fully closed packed arrangement of domains. (In practice, there may be imperfections in which gaps occur and some unevenness due to overlapping droplets or domains.) On this basis, the calculated amount is preferably less than about 150 percent of the amount needed for monolayer domain coverage, preferably not more than about 125 percent of the amount needed for a monolayer domain coverage, more preferably not more than 110 percent of the amount needed for a monolayer of domains. Furthermore, improved viewing angle and broadband features may be obtained by appropriate choice of differently doped domains based on the geometry of the coated droplet and the Bragg reflection condition.

The liquid crystal material in binder may be dueled with an aqueous hardener solution to create a material resistant to humidity and temperature variations when used the display. The addition of a bacteriostat prevents gelatin degradation during emulsion storage and during material operation. The gelatin concentration in the emulsion when coated is preferably between about 2 and 20 weight percent based on the weight of the emulsion. In the final emulsion, the liquid crystal material may be dispersed at 8% concentration in a 5% gelatin aqueous solution.

Although hardened gelatin is used in photographs to harden the material, the need is not the same in liquid crystal displays in which the gelatin is typically protected by several layers of material including a plastic or glass substrate. Typically, liquid crystal material is wicked between plates of glass. Furthermore, unless necessary, a gelatin hardener can be problematic for coating a gelatin material and may require more difficult manufacture. However, gelatin, containing hardener, may optionally be used in the present invention. In the context of this invention, hardeners are defined as any additive, which causes chemical crosslinking in gelatin or gelatin derivatives.

Many conventional hardeners are known to crosslink gelatin. Gelatin crosslinking agents (i.e., the hardener) are included in an amount of at least about 0.01 wt. % and preferably from about 0.1 to about 10 wt. % based on the weight of the solid dried gelatin material used (by dried gelatin it is meant substantially dry gelatin at ambient conditions as for example obtained from Eastman Gel Co., as compared to swollen gelatin), and more preferably in the amount of from about 1 to about 5 percent by weight. More than one gelatin crosslinking agent can be used if desired. Suitable hardeners may include inorganic, organic hardeners, such as aldehyde hardeners and olefinic hardeners. Inorganic hardeners include compounds such as aluminum salts, especially the sulfate, potassium and ammonium alums, ammonium zirconium carbonate, chromium salts such as chromium sulfate and chromium alum, and salts of titanium dioxide, and zirconium dioxide. Representative organic hardeners or gelatin crosslinking agents may include aldehyde and related compounds, pyridiniums, olefins, carbodiimides, and epoxides. Thus, suitable aldehyde hardeners include formaldehyde and compounds that contain two or more aldehyde functional groups such as glyoxal, gluteraldehyde and the like. Other preferred hardeners include compounds that contain blocked aldehyde functional groups such as aldehydes of the type tetrahydro-4-hydroxy-5-methyl-2 (1H)-pyrimidinone polymers (Sequa SUNREZ® 700), polymers of the type having a glyoxal polyol reaction product consisting of 1 anhydroglucose unit: 2 glyoxal units (SEQUAREZ® 755 obtained from Sequa Chemicals, Inc.), DME-Melamine non-formaldehyde resins such as Sequa CPD3046-76 obtained from Sequa Chemicals Inc., and 2,3-dihydroxy-1,4-dioxane (DHD). Thus, hardeners that contain active olefinic functional groups include, for example, bis-(vinylsulfonyl)-methane (BVSM), bis-(vinylsulfonyl-methyl) ether (BVSME), 1,3,5-triacryloylhexahydro-s-triazine, and the like. In the context of the present invention, active olefinic compounds are defined as compounds having two or more olefinic bonds, especially unsubstituted vinyl groups, activated by adjacent electron withdrawing groups (The Theory of the Photographic Process, 4th Edition, T. H. James, 1977, Macmillan Publishing Co., page 82). Other examples of hardening agents can be found in standard references such as The Theory of the Photographic Process, T. H. James, Macmillan Publishing Co., Inc. (New York 1977) or in Research Disclosure, September 1996, Vol. 389, Part IIB (Hardeners) or in Research Disclosure, September 1994, Vol. 365, Item 36544, Part IIB (Hardeners). Research Disclosure is published by Kenneth Mason Publications, Ltd., Dudley House, 12 North St., Emsworth, Hampshire P010 7DQ, England. Olefinic hardeners are most preferred, as disclosed in U.S. Pat. Nos. 3,689,274, 2,994,611, 3,642,486, 3,490,911, 3,635,718, 3,640,720, 2,992,109, 3,232,763, and 3,360,372.

Among hardeners of the active olefin type, a preferred class of hardeners particularly are compounds comprising two or more vinyl sulfonyl groups. These compounds are hereinafter referred to as "vinyl sulfones". Compounds of this type are described in numerous patents including, for example, U.S. Pat. Nos. 3,490,911, 3,642,486, 3,841,872 and 4,171,976. Vinyl sulfone hardeners are believed to be effective as hardeners as a result of their ability to crosslink polymers making up the colloid.

The liquid crystalline droplets or domains may be formed by any method, known to those of skill in the art, which will allow control of the domain size. In a preferred embodiment, a method referred to as "limited coalescence" is used to form uniformly sized emulsions of liquid crystalline material. For example, the liquid crystal material can be homogenized in the presence of finely divided silica, a coalescence limiting material, such as LUDOX® from DuPont Corporation. A promoter material can be added to the aqueous bath to drive the colloidal particles to the liquid-liquid interface. In a preferred embodiment, a copolymer of adipic acid and 2-(methylamino)ethanol can be used as the promoting agent in the water bath. The liquid crystal material can be dispersed using ultrasound to create liquid crystal domains below 1 micron in size. When the ultrasound energy is removed, the liquid crystal material coalesces into domains of uniform size. For domains to be of uniform size, the ratio of smallest to largest domain size for one emulsion varies by approximately 1:2. By varying the amount of silica and copolymer relative to the liquid crystalline material, uniform domain size emulsions of the desired average diameter (by microscopy), for example 3 or 8 micron, can be produced. These emulsions can be diluted into gelatin solution for subsequent coating. To achieve improved brightness and reduced roughness two or more emulsions are blended to form one coating. The various emulsions can be blended at several different times in the coating process. The limited coalescent materials can be coated using a photographic emulsion coating machine onto sheets of polyester having an ITO coating with a sheet conductivity of 300 ohms per square. The coating can be dried to provide a polymerically dispersed cholesteric coating. By using limited coalescence, there are few, if any, parasitic smaller domains (having undesirable electro-optical properties) within the dried coatings.

In addition to binder and hardener, liquid crystal layers may also contain a small amount of light absorbing colorant, preferably an absorber dye. It is preferred that an absorbing dye is used to selectively absorb back scattered light from the focal conic state at the lowest wavelengths in the visible part of the spectrum. Further, the colorant selectively absorbs similarly scattered light from the planar state, while only minimally absorbing the main body of reflected light. The colorants may include both dyes and pigments. The colorant may absorb light components, which may cause turbidity of color in the color display performed by selective reflection of the liquid crystal or may cause lowering of a transparency in the transparent state of the liquid crystal, and therefore can improve the display quality. Two or more of the components in the liquid crystal display may contain a coloring agent. For example, both the polymer and the liquid crystal may contain the coloring agent. Preferably, a colorant is selected, which absorbs rays in a range of shorter wavelengths than the selective reflection wavelength of the liquid crystal.

Any amount of colorant may be used, provided that addition of the colorant does not remarkably impair the switching characteristics of the liquid crystal material for display. In addition, if the polymeric binder is formed by polymerization, the addition does not inhibit the polymerization. An exemplary amount of colorant is from at least 0.1 weight % to 5 weight % of the liquid crystal material.

In a preferred embodiment, the colorants, preferably absorber dyes, are incorporated directly in the CLC materials. Any colorants that are miscible with the cholesteric liquid crystal materials are useful for this purpose. Most preferred are colorants that are readily soluble in toluene. By readily soluble is meant preferably a solubility greater than 1 gram per liter, more preferably greater than 10 grams per liter and most preferably greater than 100 grams per liter. The inventors have determined that toluene soluble dyes are most compatible with the cholesteric liquid crystal materials. Suitable colorants are anthraquinone dyes such as Sandoplast Blue 2B from Clariant Corporation, phthalocyanine dyes such as Savinyl Blue GLS from Clariant Corporation or Neozapon Blue 807 from BASF Corporation, methine dyes such as Sandoplast Yellow 3G from Clariant Corporation or metal complex dyes such as Neozapon Yellow 157, Neozapon Orange 251, Neozapon Green 975, Neozapon Blue 807 or Neozapon Red 365 from BASF Corporation. Other colorants are Neopen Blue 808, Neopen Yellow 075, Sudan Orange 220 or Sudan Blue 670 from BASF Corporation. Other types of colorants may include various kinds of dyestuff such as dyestuff for resin coloring and dichromatic dyestuff for liquid crystal display. The dyestuff for resin coloring may be SPR RED1 (manufactured by Mitsui Toatsu Senryo Co., Ltd.). The dichromatic dyestuff for liquid crystal is specifically SI-424 or M-483 (both manufactured by Mitsui Toatsu Senryo Co., Ltd.).

Another aspect of the present invention relates to a display sheet comprising a substrate, an electrically conductive layer formed over the substrate, and a liquid crystal containing imaging layer comprising a chiral nematic material formed by the above described methods disposed over the electrically conductive layer.

As used herein, the phase a "liquid crystal display" (LCD) is a type of flat panel display used in various electronic devices. At a minimum, an LCD comprises a substrate, at least one conductive layer and a liquid crystal layer. LCDs may also comprise two sheets of polarizing material with a liquid crystal solution between the polarizing sheets. The sheets of polarizing material may comprise a substrate of glass or transparent plastic. The LCD may also include functional layers. In one embodiment of an LCD, a transparent, multilayer flexible support is coated with a first conductive layer, which may be patterned, onto which is coated the light modulating liquid crystal layer. A second conductive layer is applied and overcoated with a dielectric layer to which dielectric conductive row contacts are attached, including via holes that permit interconnection between conductive layers and the dielectric conductive row contacts. An optional nanopigmented functional layer may be applied between the liquid crystal layer and the second conductive layer.

The liquid crystal (LC) is used as an optical switch. The substrates are usually manufactured with transparent, conductive electrodes, in which electrical "driving" signals are coupled. The driving signals induce an electric field which can cause a phase change or state change in the liquid crystal material, thus exhibiting different light reflecting characteristics according to its phase and/or state.

FIG. 1 is a sectional view of a portion of a sheet 10 supporting a conventional polymer dispersed electrically modulated material. The sheet 10 includes a substrate 15. Substrate 15 can be made of a polymeric material, such as Kodak Estar film base formed of polyester plastic, and have a thickness of between 20 and 200 microns. For example, substrate 15 can be a 80 micron thick sheet of transparent polyester. Other polymers, such as transparent polycarbonate, can also be used. Alternatively, substrate 15 can be thin, transparent glass.

A first conductor 20 is formed over substrate 15. First conductor 20 can be a transparent, electrically conductive layer of tin-oxide or indium-tin-oxide (ITO), with ITO being the preferred material. Typically, first conductor 20 is sputtered onto the substrate 15 to a resistance of less than 250 ohms per square. Alternatively, first conductor 20 can be an opaque electrical conductor formed of metal such as copper, aluminum or nickel. If first conductor 20 is an opaque metal, the metal can be a metal oxide to create a light absorbing first conductor 20. A second conductor 22 may be applied to the surface of electro-optical imaging layer 30. Second conductor 22 should have sufficient conductivity to carry a field across electro-optical imaging layer 30. Second conductor 22 can be formed in a vacuum environment using materials such as aluminum, tin, silver, platinum, carbon, tungsten, molybdenum, or indium.

In a preferred embodiment of the invention, the display device or display sheet has simply a single imaging layer of liquid crystal material along a line perpendicular to the face of the display, preferably a single layer coated on a flexible substrate. Such as structure, as compared to vertically stacked imaging layers each between opposing substrates, is especially advantageous for monochrome shelf labels and the like. Structures having stacked imaging layers, however, are optional for providing additional advantages in some case.

There are alternative display technologies to LCDs that can be used, for example, in flat panel displays. A notable example is organic or polymer light emitting devices (OLEDs) or (PLEDs), which are comprised of several layers in which one of the layers is comprised of an organic material that can be made to electroluminesce by applying a voltage across the device. An OLED device is typically a laminate formed in a substrate such as glass or a plastic polymer. A light emitting layer of a luminescent organic solid, as well as adjacent semiconductor layers, are sandwiched between an anode and a cathode. The semiconductor layers can be hole injecting and electron injecting layers. PLEDs can be considered a subspecies of OLEDs in which the luminescent organic material is a polymer. The light emitting layers may be selected from any of a multitude of light emitting organic solids, for example, polymers that are suitably fluorescent or chemiluminescent organic compounds. Such compounds and polymers include metal ion salts of 8-hydroxyquinolate, trivalent metal quinolate complexes, trivalent metal bridged quinolate complexes, Schiff-based divalent metal complexes, tin (IV) metal complexes, metal acetylacetonate complexes, metal bidenate ligand complexes incorporating organic ligands, such as 2-picolylketones, 2-quinaldylketones, or 2-(o-phenoxy) pyridine ketones, bisphosphonates, divalent metal maleonitriledithiolate complexes, molecular charge transfer complexes, rare earth mixed chelates, (5-hydroxy) quinoxaline metal complexes, aluminum tris-quinolates, and polymers such as poly(p-phenylenevinylene), poly(dialkoxyphenylenevinylene), poly(thiophene), poly(fluorene), poly(phenylene), poly(phenylacetylene), poly(aniline), poly(3-alkylthiophene), poly(3-octylthiophene), and poly(N-vinylcarbazole). When a potential difference is applied across the cathode and anode, electrons from the electron injecting layer and holes from the hole injecting layer are injected into the light emitting layer, they recombine, emitting light. OLEDs and PLEDs are described in the following United States patents, all of which are incorporated herein by this reference: U.S. Pat. No. 5,707,745 to Forrest et al., U.S. Pat. No. 5,721,160 to Forrest et al., U.S. Pat. No. 5,757,026 to Forrest et al., U.S. Pat. No. 5,834,893 to Bulovic et al., U.S. Pat. No. 5,861,219 to Thompson et al., U.S. Pat. No. 5,904,916 to Tang et al., U.S. Pat. No. 5,986,401 to Thompson et al., U.S. Pat. No. 5,998,803 to Forrest et al., U.S. Pat. No. 6,013,538 to Burrows et al., U.S. Pat. No. 6,046,543 to Bulovic et al., U.S. Pat. No. 6,048,573 to Tang et al., U.S. Pat. No. 6,048,630 to Burrows et al., U.S. Pat. No. 6,066,357 to Tang et al., U.S. Pat. No. 6,125,226 to Forrest et al., U.S. Pat. No. 6,137,223 to Hung et al., U.S. Pat. No. 6,242,115 to Thompson et al., and U.S. Pat. No. 6,274,980 to Burrows et al.

In a typical matrix-addressable light emitting display device, numerous light emitting devices are formed on a single substrate and arranged in groups in a regular grid pattern. Activation may be by rows and columns, or in an active matrix with individual cathode and anode paths. OLEDs are often manufactured by first depositing a transparent electrode on the substrate, and patterning the same into electrode portions. The organic layer(s) is then deposited over the transparent electrode. A metallic electrode can be formed over the electrode layers. For example, in U.S. Pat. No. 5,703,436 to Forrest et al., incorporated herein by reference, transparent indium tin oxide (ITO) is used as the Hole injecting electrode, and a Mg—Ag—ITO electrode layer is used for electron injection.

The flexible plastic substrate can be any flexible self-supporting plastic film that supports the thin conductive metallic film. "Plastic" means a high polymer, usually made from polymeric synthetic resins, which may be combined with other ingredients, such as curatives, fillers, reinforcing agents, colorants, and plasticizers. Plastic includes thermoplastic materials and thermosetting materials.

The flexible plastic film must have sufficient thickness and mechanical integrity so as to be self-supporting, yet should not be so thick as to be rigid. Typically, the flexible plastic substrate is the thickest layer of the composite film in thickness. Consequently, the substrate determines to a large extent the mechanical and thermal stability of the fully structured composite film.

Another significant characteristic of the flexible plastic substrate material is its glass transition temperature (Tg). Tg is defined as the glass transition temperature at which plastic material will change from the glassy state to the rubbery state. It may comprise a range before the material may actually flow. Suitable materials for the flexible plastic substrate include thermoplastics of a relatively low glass transition temperature, for example up to 150° C., as well as materials of a higher glass transition temperature, for example, above 150° C. The choice of material for the flexible plastic substrate would depend on factors such as manufacturing process conditions, such as deposition temperature, and annealing temperature, as well as post manufacturing conditions such as in a process line of a displays manufacturer. Certain of the plastic substrates discussed below can withstand higher processing temperatures of up to at least about 200° C., some up to 300–350° C., without damage.

Typically, the flexible plastic substrate is polyethylene terephthalate (PET), polyethylene naphthalate (PEN), polyethersulfone (PES), polycarbonate (PC), polysulfone, a phenolic resin, an epoxy resin, polyester, polyimide, polyetherester, polyetheramide, cellulose acetate, aliphatic polyurethanes, polyacrylonitrile, polytetrafluoroethylenes, polyvinylidene fluorides, poly(methyl x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly (ether ether ketone) (PEEK), poly(ether ketone) (PEK), poly(ethylene tetrafluoroethylene) fluoropolymer (PETFE), and poly(methyl methacrylate) and various acrylate/methacrylate copolymers (PMMA). Aliphatic polyolefins may include high density polyethylene (HDPE), low density polyethylene (LDPE), and polypropylene, including oriented polypropylene (OPP). Cyclic polyolefins may include poly(bis(cyclopentadiene)). A preferred flexible plastic substrate is a cyclic polyolefin or a polyester. Various cyclic polyolefins are suitable for the flexible plastic substrate. Examples include Arton® made by Japan Synthetic Rubber Co., Tokyo, Japan, Zeanor T made by Zeon Chemicals L. P., Tokyo Japan, and Topas® made by Celanese A. G., Kronberg Germany. Arton is a poly(bis(cyclopentadiene)) condensate that is a film of a polymer. Alternatively, the flexible plastic substrate can be a polyester. A preferred polyester is an aromatic polyester such as Arylite. Although various examples of plastic substrates are set forth above, it should be appreciated that the substrate can also be formed from other materials such as glass and quartz.

The flexible plastic substrate can be reinforced with a hard coating. Typically, the hard coating is an acrylic coating. Such a hard coating typically has a thickness of from 1 to 15 microns, preferably from 2 to 4 microns and can be provided by free radical polymerization, initiated either thermally or by ultraviolet radiation, of an appropriate polymerizable material. Depending on the substrate, different hard coatings can be used. When the substrate is polyester or Arton, a particularly preferred hard coating is the coating known as "Lintec". Lintec contains UV cured polyester acrylate and colloidal silica. When deposited on Arton, it has a surface composition of 35 atom % C, 45 atom % 0, and 20 atom % Si, excluding hydrogen. Another particularly preferred hard coating is the acrylic coating sold under the trademark "Terrapin" by Tekra Corporation, New Berlin, Wis.

The LCD contains at least one conductive layer, which typically is comprised of a primary metal oxide. This conductive layer may comprise other metal oxides such as indium oxide, titanium dioxide, cadmium oxide, gallium indium oxide, niobium pentoxide and tin dioxide. See, Int. Publ. No. WO 99/36261 by Polaroid Corporation. In addition to the primary oxide such as ITO, the at least one conductive layer can also comprise a secondary metal oxide such as an oxide of cerium, titanium, zirconium, hafnium and/or tantalum. See, U.S. Pat. No. 5,667,853 to Fukuyoshi et al. (Toppan Printing Co.) Other transparent conductive oxides include, but are not limited to, $ZnO_2$, $Zn_2SnO_4$, $Cd_2SnO_4$, $Zn_2In_2O_5$, $MgIn_2O_4$, $Ga_2O_3$—$In_2O_3$, or $TaO_3$. The conductive layer may be formed, for example, by a low temperature sputtering technique or by a direct current sputtering technique, such as DC sputtering or RF-DC sputtering, depending upon the material or materials of the underlying layer. The conductive layer may be a transparent, electrically conductive layer of tin oxide or indium tin oxide (ITO), or polythiophene (PDOT). Typically, the conductive layer is sputtered onto the substrate to a resistance of less than 250 ohms per square. Alternatively, conductive layer may be an opaque electrical conductor formed of metal such as copper, aluminum or nickel. If the conductive layer is an opaque metal, the metal can be a metal oxide to create a light absorbing conductive layer.

The material is coated over patterned ITO first conductors to provide a polymer dispersed cholesteric coating having a dried thickness of less than 50 microns, preferably less than 25 microns, more preferably less than 15 microns, most preferably less than about 10 microns.

Indium tin oxide (ITO) is the preferred conductive material, as it is a cost effective conductor with good environmental stability, up to 90% transmission, and down to 20 ohms per square resistivity. An exemplary preferred ITO layer has a % T greater than or equal to 80% in the visible region of light, that is, from greater than 400 nm to 700 nm, so that the film will be useful for display applications. In a preferred embodiment, the conductive layer comprises a layer of low temperature ITO which is polycrystalline. The ITO layer is preferably 10–120 nm in thickness, or 50–100 nm thick to achieve a resistivity of 20–60 ohms/square on plastic. An exemplary preferred ITO layer is 60–80 nm thick.

The conductive layer is preferably patterned. The conductive layer is preferably patterned into a plurality of electrodes. The patterned electrodes may be used to form a LCD device. In another embodiment, two conductive substrates are positioned facing each other and cholesteric liquid crystals are positioned there between to form a device. The patterned ITO conductive layer may have a variety of dimensions. Exemplary dimensions may include line widths of 10 microns, distances between lines, that is, electrode widths, of 200 microns, depth of cut, that is, thickness of ITO conductor, of 100 nanometers. ITO thicknesses on the order of 60, 70, and greater than 100 nanometers are also possible.

The display may also contain a second conductive layer applied to the surface of the light modulating layer. The second conductive layer desirably has sufficient conductivity to carry a field across the light modulating layer. The second conductive layer may be formed in a vacuum environment using materials such as aluminum, tin, silver, platinum, carbon, tungsten, molybdenum, or indium. Oxides of these metals can be used to darken patternable conductive layers. The metal material can be excited by energy from resistance heating, cathodic arc, electron beam, sputtering or magnetron excitation. The second conductive layer may comprise coatings of tin oxide or indium tin oxide, resulting in the layer being transparent. Alternatively, second conductive layer may be printed conductive ink.

For higher conductivities, the second conductive layer may comprise a silver based layer which contains silver only or silver containing a different element such as aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd). In a preferred embodiment, the conductive layer comprises at least one of gold, silver and a gold/silver alloy, for example, a layer of silver coated on one or both sides with a thinner layer of gold. See, Int. Publ. No. WO 99/36261 by Polaroid Corporation. In another embodiment, the conductive layer may comprise a layer of silver alloy, for example, a layer of silver coated on one or both sides with a layer of indium cerium oxide (InCeO). See U.S. Pat. No. 5,667,853, incorporated herein in by reference.

The second conductive layer may be patterned irradiating the multilayered conductor/substrate structure with ultraviolet radiation so that portions of the conductive layer are ablated therefrom. It is also known to employ an infrared (IR) fiber laser for patterning a metallic conductive layer overlying a plastic film, directly ablating the conductive layer by scanning a pattern over the conductor/film structure. See: Int. Publ. No. WO 99/36261 and "42.2: A New Conductor Structure for Plastic LCD Applications Utilizing 'All Dry' Digital Laser Patterning," 1998 SID International Symposium Digest of Technical Papers, Anaheim, Calif., May 17–22, 1998, no. VOL. 29, May 17, 1998, pages 1099–1101, both incorporated herein by reference.

In a preferred embodiment, second conductors are printed conductive ink such as ELECTRODAG 423SS screen printable electrical conductive material from Acheson Corporation. Such printed materials are finely divided graphite particles in a thermoplastic resin. The second conductors are formed using printed inks to reduce display cost. The use of a flexible support for substrate, layer laser etched first conductors, machine coating polymer dispersed cholesteric layer, and printing second conductors permit the fabrication of very low cost memory displays. Small displays formed using these methods can be used as electronically rewritable transaction cards for inexpensive, limited rewrite applications.

A light absorbing second conductor may be positioned on the side opposing the incident light. In the fully evolved focal conic state the cholesteric liquid crystal is transparent, passing incident light, which is absorbed by second conductor to provide a black image. Progressive evolution to the focal conic state causes a viewer to see an initial bright reflected light that transitions to black as the cholesteric material changes from planar state to a fully evolved focal conic state. The transition to the light transmitting state is progressive, and varying the low voltage time permits variable levels of reflection. These variable levels can be mapped out to corresponding gray levels, and when the field is removed, light modulating layer maintains a given optical state indefinitely. The states are more fully discussed in U.S. Pat. No. 5,437,811.

The LCD may also comprises at least one "functional layer" between the conductive layer and the substrate. The functional layer may comprise a protective layer or a barrier layer. The protective layer useful in the practice of the invention can be applied in any of a number of well known techniques, such as dip coating, rod coating, blade coating, air knife coating, gravure coating and reverse roll coating, extrusion coating, slide coating, curtain coating, and the like. The lubricant particles and the binder are preferably mixed together in a liquid medium to form a coating composition. The liquid medium may be a medium such as water or other aqueous solutions in which the hydrophilic colloid are dispersed with or without the presence of surfactants. A preferred barrier layer may acts as a gas barrier or a moisture barrier and may comprise $SiO_x$, $AlO_x$ or ITO. The protective layer, for example, an acrylic hard coat, functions to prevent laser light from penetrating to functional layers between the protective layer and the substrate, thereby protecting both the barrier layer and the substrate. The functional layer may also serve as an adhesion promoter of the conductive layer to the substrate.

In another embodiment, the polymeric support may further comprise an antistatic layer to manage unwanted charge build up on the sheet or web during roll conveyance or sheet finishing. In another embodiment of this invention, the antistatic layer has a surface resistivity of between $10^5$ to $10^{12}$. Above $10^{12}$, the antistatic layer typically does not provide sufficient conduction of charge to prevent charge accumulation to the point of preventing fog in photographic systems or from unwanted point switching in liquid crystal displays. While layers greater than $10^5$ will prevent charge buildup, most antistatic materials are inherently not that conductive and in those materials that are more conductive than $10^5$, there is usually some color associated with them that will reduce the overall transmission properties of the display. The antistatic layer is separate from the highly conductive layer of ITO and provides the best static control when it is on the opposite side of the web substrate from that of the ITO layer. This may include the web substrate itself.

Another type of functional layer may be a color contrast layer. Color contrast layers may be radiation reflective layers or radiation absorbing layers. In some cases, the rearmost substrate of each display may preferably be painted black. The color contrast layer may also be other colors. In another embodiment, the dark layer comprises milled nonconductive pigments. The materials are milled below 1 micron to form "nano-pigments". In a preferred embodiment, the dark layer absorbs all wavelengths of light across the visible light spectrum, that is from 400 nanometers to 700 nanometers wavelength. The dark layer may also contain a set or multiple pigment dispersions. Suitable pigments used in the color contrast layer may be any colored materials, which are practically insoluble in the medium in which they are incorporated. Suitable pigments include those described in Industrial Organic Pigments: Production, Properties, Applications by W. Herbst and K. Hunger, 1993, Wiley Publishers. These include, but are not limited to, Azo Pigments such as monoazo yellow and orange, diazo, naphthol, naphthol reds, azo lakes, benzimidazolone, diazo condensation, metal complex, isoindolinone and isoindolinic, polycyclic pigments such as phthalocyanine, quinacridone, perylene, perinone, diketopyrrolo-pyrrole, and thioindigo, and anthriquinone pigments such as anthrapyrimidine.

The functional layer may also comprise a dielectric material. A dielectric layer, for purposes of the present invention, is a layer that is not conductive or blocks the flow of electricity. This dielectric material may include a UV curable, thermoplastic, screen printable material, such as Electrodag 25208 dielectric coating from Acheson Corporation. The dielectric material forms a dielectric layer. This layer may include openings to define image areas, which are coincident with the openings. Since the image is viewed through a transparent substrate, the indicia are mirror imaged. The dielectric material may form an adhesive layer to subsequently bond a second electrode to the light modulating layer.

The liquid crystal containing composition of the invention can be applied by any of a number of well known techniques, such as dip coating, rod coating, blade coating, air knife coating, gravure coating and reverse roll coating, extrusion coating, slide (or bead) coating, curtain coating, and the like. Many different methods are commonly used to deliver the liquid crystal containing composition at the correct dry laydown. One such method is delivering the liquid crystal containing composition containing different domain through multiple pumps and mixing them just prior to the coating application point. Another method that is commonly used to deliver the liquid crystal containing composition at the correct dry laydown is by mixing the liquid crystal containing composition containing different domain into one container and delivering the solution to the hopper.

After coating, the layer is generally dried by simple evaporation, which may be accelerated by known techniques such as convection heating or impingement of forced air, at a temperature and rate that will not soften the emulsion at any given water concentration of the drying emulsion. Known coating and drying methods are described in further detail in Research Disclosure No. 308119, Published December 1989, pages 1007 to 1008. The coating is preferably dried by the impingement of air at a temperature and humidity that maintains the high viscosity of the gel state of the dispersing phase, thereby preventing remelting of the gelatin matrix and softening of the gelatin such that damage to the coating occurs. The coating is maintained below the melt temperature during drying. The melt temperature is the temperature at which the set coating will turn back into liquid form. If remelt occurs, air flow within the dryer can disturb the coating and, in severe cases of remelt, the coating liquid can trackoff within the machine, requiring the machine to be shutdown for cleaning.

A coated sheet can be formed using inexpensive, efficient layering methods. A single large volume of sheet material can be coated and formed into various types of smaller sheets for use in display devices such as transaction cards, shelf labels, large format signage, and the like. Displays in the form of sheets in accordance with the present invention are inexpensive, simple, and fabricated using low cost processes.

In the preferred embodiment, immediately after the emulsion is coated on a substrate, the emulsion temperature is rapidly lowered from about 40° C to about 10° C. in a chilling section. The lowering of emulsion temperature changes the state of the coated emulsion from a liquid to a semi-solid gel. The chilling of the emulsion permits, in the preferred embodiment, the emulsion to travel through a series of warm air impingement dryers with no disruption to the coating. The chilling of the emulsion also allows the emulsion and substrate to travel over a series of rollers as it conveys through the machine. In a preferred commercial embodiment, the substrate to be coated is in the form of a moving web. The speed of the moving web is a function of the length of the chill box and the length of the dryer. The high polymeric content of the coated material permits the dried and coated web to be wound on a roll. Thus, in a commercial operation, the coated substrate can be passed over rollers during the drying process, and once dried, wound on cores. After completing the manufacture of a coated liquid crystal sheet material between spaced electrodes, the sheet material can be cut into a plurality of smaller, individual areas for use in various display or other applications.

The following examples are provided to illustrate the invention.

EXAMPLE 1

An experiment was performed to examine the effects of varying the domain size of the chiral nematic liquid crystal. Emulsions A through H were prepared using cholesteric liquid crystal oil MERCK BL118, available from E. M. Industries of Hawthorne, N.Y. U.S.A. by limited coalescence in accordance with the procedure described in U.S. Pat. No. 6,556,262 to Stephenson.

For an emulsion having domain size of approximately 10 microns, the following procedure was used: The emulsions were made by first preparing BL118 slurry. A solution of 230 gms of distilled water, 103.5 gms BL118, 3.41 gms LUDOX® M50, and 7.12 gms of MAE adipate. Simultaneously, a solution of MAE adipate consisting of 2.0 gms MAE adipate and 18 gms distilled water. The solutions were added together, heated to 50 C, and mixed with a high shear Silverson mixer at 5000 rpm for 2 minutes. The solution is then passed through a Microfluidizer twice at 3000 psi at 50 C. 408 gms of a 1000 gm batch of gelatin solution, made of 90 gms of dry gel, 2 gms of biocide to 908 gms of water, melted at 50 C, is then added to the Microfluidized BL118 slurry.

For an emulsion having domain size of approximately 5 microns, the following procedure was used: The emulsions were made by first preparing BL118 slurry. A solution of 105 gms of distilled water, 50 gins BL118, 3.29 gms LUDOX® M50, and 6.88 gms of MAE adipate. Simultaneously, a solution of MAE adipate consisting of 2.0 gms MAE adipate and 18 gms distilled water. The solutions were added together, heated to 50 C, and mixed with a high shear Silverson mixer at 5000 rpm for 2 minutes. The solution is then passed through a Microfluidizer twice at 3000 psi at 50C. 182 gms of a 1000 gm batch of gelatin solution, made of 90 gms of dry gel, 2 gms of biocide to 908 gms of water, melted at 50 C, is then added to the Microfluidized BL118 slurry. The amount of additional LUDOX® added to the slurry will determine the size of the domains, with more additional LUDOX® producing smaller domains. The resulting emulsions had low polydispersity, with volume mean diameters listed in Table 1.

Coatings 101 through 108 were prepared by making aqueous coating solutions, each containing 8 weight percent of the liquid crystal emulsion specified in Table 1 and 5 weight percent gelatin and about 0.2 weight percent of a coating surfactant. The coating solutions were heated to 45° C., to reduce the viscosity of the emulsion to approximately 8 centipoises. A polyethylene terephthalate substrate with 125-micron thickness and 5-inch width having an Indium Tin Oxide conductive layer (300 ohms/sq.) was continuously coated and dried with the heated emulsion at 61.5 cm³/m² on a coating machine. Coatings 109 and 110 were prepared by blending two emulsions prior to the time of coating in a 1:1 ratio, as listed in Table 1 below. After the coating was complete, the second conductor was applied using a screen printed graphitic ink (Acheson 423SS) patch to make displays of the invention.

A sample of the final coating was also sent for estimation of the particle size distribution by image analysis. The coating was mounted on a glass microscope slide in oil with a cover slip, and an oil coupling between the cover slip and a 100× objective lens. The sample was viewed using a research grade light microscope, such as an Olympus BX60, and photographs were taken using a CCD camera where resolution in the final image is 0.74 microns per pixel. Because of agglomeration, the diameters of 120 particles for Sample F and 172 particles for Sample C+F were measured manually. A bi-modal lognormal fit was computed using custom Excel add-ins, where GMD is the geometric mean diameter and GSD is the geometric standard deviation. The definitions of GMD and GSD can be found in *Particle Size Measurement Vol. 1*, 5$^{th}$ Ed., T. Allen (Chapman & Hall, 1997), p. 72. The data appeared as follows:

To evaluate the displays, each of the samples was measured for color space (LABR) using an X-Rite® 938 Spectrodensitometer. The test is LAB $D^{50}{}_2$. Both the planar (green) and focal conic (black) values were taken. The results are based on the CIELAB color space. The L* is the lightness of the color spectrum All the data was taken on a black background. The result shown is a average of three separate readings using the X-Rite® 938 Spectrodensitometer. The following results in Table 1 were obtained. Table 1 shows that display 109 (domain sizes 4.4+9.4) has a Planar L* value of 45.0 as compared to display 102 (domain size 4.4) having a Planar L* value of 41.1 and display 105 (domain size 9.4) having a Planar L* value of 42.3. Therefore, a layer containing combined domain sizes produces a Planar L* value, representing brightness, greater than the value produced by either domain size alone.

The surface roughness Ra, the arithmetic average height calculated over the entire measured area was measured for the surface of each liquid crystal layer prior to screen printing, using the Veeco measurement tool, and the results, are reported in units of nanometers.

TABLE 1

| Coating/Display | Emulsion | Average Domain Size [μm] | Planar L* | Focal Conic L* | Surface Roughness Ra (nm) | Visual Appearance (relative to control display 5) | |
|---|---|---|---|---|---|---|---|
| 101 | A | 2.2 | 43.5 | 38.0 | 270 | Much less bright | Comparison |
| 102 | B | 4.4 | 41.1 | 27.7 | 375 | Much less bright | Comparison |
| 103 | C | 7.4 | 42.2 | 24.3 | 600 | Similar | Comparison |
| 104 | D | 8.6 | 42.8 | 21.8 | 730 | Similar | Comparison |
| 105 | E | 9.4 | 42.3 | 24.2 | 825 | control | Comparison |
| 106 | F | 12.7 | 36.7 | 23.9 | 1300 | Less bright | Comparison |
| 107 | G | 14.6 | 37.6 | 23.1 | 1875 | Less bright | Comparison |
| 108 | H | 17.5 | 32.6 |  | 2800 | Less bright | Comparison |
| 109 | B + E | 4.4 + 9.4 | 45.0 | 24.2 | 620 | Similar | Invention |
| 110 | C + F | 7.4 + 12.7 | 44.1 | 27.0 | 830 | Similar | Invention |

| Bimodal Lognormal Fit | | |
|---|---|---|
| Statistic | Sample F | Sample C + F |
| count | 120 | 172 |
| GMD 1$^{st}$ domain size [μm] | 22.996 | 12.957 |
| GSD 1$^{st}$ domain size | 1.129 | 1.145 |
| GMD 2$^{nd}$ domain size [μm] | — | 23.625 |
| GSD 2$^{nd}$ domain size | — | 1.169 |

This data shows that mixing two domain sizes together resulted in improved surface roughness. This improvement appeared to be maximized for domain sizes greater than 6 microns.

EXAMPLE 2

Coatings 201 through 203 were prepared as coatings 101 through 110, using blends of emulsions A through H as specified in the table below. The following results in Table 2 were obtained.

TABLE 2

| Sample Identifier | Emulsions | Domain Size | Ratio of each domain | Planar L* | Focal Conic L* | Surface roughness | Visual Appearance | |
|---|---|---|---|---|---|---|---|---|
| 201 | C + D + F + G + H | 7.4 + 8.6 + 12.7 + 14.6 + 17.5 | 20/20/20/20/40 | 36.7 | 25.0 | 2232 nm | Good | Invention |
| 202 | D + G + H | 8.6 + 14.6 + 17.5 | 30/30/40 | 36.7 |  | 2481 nm | Good | Invention |
| 203 | D + G | 8.6 + 14.6 | 50/50 | 37.6 | 21.8 | 2047 nm | Good | Invention |

Table 2 is intended to illustrate that functional displays may be made with two or more domain sizes. The data from Table 2 is not intended for comparison from the data in Table 1, as the coatings in Example 2 were made by hand coating, while the coatings prepared in Example 1 were prepared via machine coating. It is expected that coatings prepared in the laboratory by hand would have roughness values higher than those achieved via photographic coating machine.

EXAMPLE 3

An experiment was performed to examine the effects of mixing two separate domain sizes together at different ratios using a chiral nematic (cholesteric) liquid crystal. Emulsions I and J were prepared using cholesteric liquid crystal oil MERCK BL118, available from E. M. Industries of Hawthorne, N.Y. U.S.A. by limited coalescence in accordance with the procedure described in U.S. Pat. No. 6,556,262 to Stephenson. The two resulting emulsions had low polydispersity, with volume mean diameters listed in Table 3. The first layer was applied to the substrate at 61.46 ml/m². A second dark layer comprising 4 wt % gelatin containing a mixture of cyan, magenta, yellow, and carbon pigments which was formulated to provide a neutral black density, was applied at 10.76 ml/m². These two layers were simultaneously coated using a slide hopper. The resulting coated layers were cooled to temperature, approximately 10 degrees Celsius, to chill set the gelatin, and then dried at approximately 20 degrees Celsius. The coating compositions were prepared by mixing two individual domain emulsions just prior to the time of coating.

A series of Coatings 301 through 304 were prepared by making two aqueous coating solutions, each containing 8 weight percent of the liquid crystal and 5 weight percent gelatin and about 0.2 weight percent of a coating surfactant. The individual coating compositions are specified in Table 3 and prepared as referenced above. The coating solutions were heated to 45° C., which reduced the viscosity of the first coating solution to approximately 8 centipoises, and the dark layer viscosity to approximately 90 centipoise. A polyethylene terephthalate substrate with 125-micron thickness and 5-inch width having an Indium Tin Oxide conductive layer (300 ohms/sq.) was continuously coated and dried with the dueled two emulsions on a photographic coating machine. After the coating was complete, the second conductor was prepared using a screen printed UV curable ink (UVAg 10 from Allied Chemical) patches.

These displays were evaluated as follows:

The samples were illuminated by two 15 inch diagonal white flat panels (from Socker Yale) were arranged on opposite side of the display with their surface normals tilted about 130 degrees from the display surface normal. Reflected light was viewed at normal incidence with a black and white Hitachi Digital video camera through a green filter (Hoya G X1, 52 mm) and the resulting images were captured and digitized for evaluation. The camera, filter and lighting arrangement was first calibrated using a set of 8 Munsel ND reflection standards whose reflection values (for green reflection) were determined using an X-Rite® 938 spectrophotometer. A reflection calibration was determined from a linear fit of the average raw digitized camera values for each reflection standard verses the measured reflection values.

Each display example was written using an electrical drive scheme with fixed 40 ms preparation time, 500 Hz preparation frequency, 1 ms selection time, 500 Hz selection frequency, 5 ms evolution time and 2000 Hz evolution frequency. The selection electromotive force (V) was varied from 85 V to 125 v. The percent reflection was measured for the patches that were switched into the planar and focal conic states. The contrast ratio was defined as the ratio of the planar reflection divided by the focal conic reflection. A graph of the contrast ratio as a function of selection voltage was fit to a third order polynomial curve. The maximum of the fitted curve is here reported as the optimum contrast and the voltage associated with that point on the curve is reported as the optimum contrast drive voltage.

TABLE 3

| Examples | % Large | % small | Optimum Contrast |
|----------|---------|---------|------------------|
| 301 | 100 | 0 | 4.6 |
| 302 | 25 | 75 | 4.9 |
| 303 | 50 | 50 | 4.8 |
| 304 | 75 | 25 | 4.7 |

This experiment demonstrated that the Optimum Contrast was improved with the bimodal mixtures consisting of 25% Large and 75% small when compared to the control coating having 100% 10 micron (large) droplets. The optimum contrast increased from 4.6 to 4.9 (base on B&W camera with green filter). The electromotive force needed to achieve optimum contrast was the same for all mixtures tested within experimental error.

The invention has been described in detail with particular reference to certain preferred embodiments thereof, but it will be understood that variations and modifications can be effected within the spirit and scope of the invention.

The invention claimed is:

1. An electro-optical imaging layer comprising a binder having dispersed therein a blended mixture of at least two electrically modulated material domains of different uniform sizes, wherein the ratio of smallest to largest domain size for each of said electrically modulated material domains of different uniform sizes varies by no more than 1:2.

2. The electro-optical imaging layer of claim 1 wherein said electrically modulated material comprises a liquid crystalline material.

3. The electro-optical imaging layer of claim 1 wherein said electrically modulated material comprises a bistable liquid crystalline material.

4. The electro-optical imaging layer of claim 3 wherein said bistable liquid crystalline material comprises a chiral nematic liquid crystal layer.

5. The electro-optical imaging layer of claim 1 wherein said electro-optical imaging layer comprises a monolayer of said at least two liquid crystal domains of different sizes.

6. The electro-optical imaging layer of claim 1 wherein said at least two electrically modulated material domains of different uniform sizes comprise at least one liquid crystal domain size greater than 6 microns.

7. The electro-optical imaging layer of claim 6 wherein said at least one liquid crystal domain size greater than 6 microns comprises at least one chiral nematic liquid crystal domain size greater than 6 microns.

8. The electro-optical imaging layer of claim 1 wherein said at least two electrically modulated material domains of different uniform sizes comprise at least one electrically modulated material domain of 6 microns and at least one electrically modulated material domain of less than 10 microns.

9. The electro-optical imaging layer of claim 1 wherein said at least two electrically modulated material domains of different uniform sizes have an average diameter of at least 2 microns in the as-applied state.

10. The electro-optical imaging layer of claim 1 wherein said at least two electrically modulated material domains of different uniform sizes have an average diameter of from 2 to 30 microns.

11. The electro-optical imaging layer of claim 1 wherein said at least two electrically modulated material domains of different uniform sizes are flattened spheres.

12. The electro-optical imaging layer of claim 1 wherein said at least two electrically modulated material domains of different uniform sizes have on average thickness at least 50% less than their length.

13. The electro-optical imaging layer of claim 1 wherein said at least two electrically modulated material domains of different uniform sizes domains on average have a thickness (depth) to length ratio of 1:2 to 1:6.

14. The electro-optical imaging layer of claim 1 wherein said at least two electrically modulated material domains of different uniform sizes comprise 50% of a first liquid crystal domain size and 50% of a second liquid crystal domain size.

15. The electro-optical imaging layer of claim 1 wherein said at least two liquid crystal domains of different sizes comprise three liquid crystal domains of different sizes.

16. The electro-optical imaging layer of claim 1 wherein said binder comprises gelatin.

17. The electro-optical imaging layer of claim 16 wherein said layer further comprises a hardening agent.

18. The electro-optical imaging layer of claim 17 wherein said hardening agent comprises a vinyl sulfone compound.

19. The electro-optical imaging layer of claim 1 wherein said electro-optical imaging layer is coated and dried to a thickness of from 5 to 30 microns.

20. The electro-optical imaging layer of claim 1 wherein said imaging layer has a thickness 2 to 20 microns when dried.

21. A display comprising a flexible transparent support, a patterned transparent first conductor layer, and an electro-optical imaging layer comprising a binder having dispersed therein a blended mixture of at least two electrically modulated material domains of different uniform sizes, wherein the ratio of smallest to largest domain size for each of the electrically modulated material domains of different uniform sizes varies by no more than 1:2.

22. The display of claim 21 wherein said substrate is flexible.

23. The display of claim 21 wherein said substrate is transparent.

24. The display of claim 23 wherein said transparent substrate comprises polyester.

25. The display of claim 23 wherein said transparent substrate comprises polycarbonate.

26. The display of claim 23 wherein said transparent substrate comprises polyethylene naphthalate (PEN).

27. The display of claim 23 wherein said transparent substrate comprises acetate.

28. The display of claim 23 wherein said transparent substrate comprises polyethersulfone.

29. The display of claim 23 wherein said transparent substrate comprises at least one member selected from the group consisting of polyolefin, polyester, polycarbonate, acetate, cyclic polyolefin, polyethersulfone, and polyamide.

30. The electro-optical imaging layer of claim 21 wherein said electrically modulated material comprises a liquid crystalline material.

31. The electro-optical imaging layer of claim 21 wherein said electrically modulated material comprises a bistable liquid crystalline material.

32. The electro-optical imaging layer of claim 31 wherein said bistable liquid crystalline material comprises a chiral nematic liquid crystal layer.

33. The electro-optical imaging layer of claim 21 wherein said electro-optical imaging layer comprises a monolayer of said at least two liquid crystal domains of different sizes.

34. The electro-optical imaging layer of claim 21 wherein said at least two- electrically modulated material domains of different uniform sizes comprise at least one liquid crystal domain size greater than 6 microns.

35. The electro-optical imaging layer of claim 34 wherein said at least one liquid crystal domain size greater than 6 microns comprises at least one chiral nematic liquid crystal domain size greater than 6 microns.

36. The electro-optical imaging layer of claim 21 wherein said at least two electrically modulated material domains of different uniform sizes comprise at least one electrically modulated material domain of 6 microns and at least one electrically modulated material domain of less then 10 microns.

37. The electro-optical imaging layer of claim 21 wherein said at least two electrically modulated material domains of different uniform sizes have an average diameter of at least 2 microns in the as-applied state.

38. The electro-optical imaging layer of claim 21 wherein said at least two electrically modulated material domains of different uniform sizes have an average diameter of from 2 to 30 microns.

39. The electro-optical imaging layer of claim 21 wherein said at least two electrically modulated material domains of different uniform sizes are flattened spheres.

40. The electro-optical imaging layer of claim 21 wherein said at least two electrically modulated material domains of different uniform sizes have on average thickness at least 50% less than their length.

41. The electro-optical imaging layer of claim 21 wherein said at least two electrically modulated material domains of different uniform sizes domains on average have a thickness (depth) to length ratio of 1:2 to 1:6.

42. The electro-optical imaging layer of claim 21 wherein said at least two electrically modulated material domains of different uniform sizes comprise 50% of a first liquid crystal domain size and 50% of a second liquid crystal domain size.

43. The electro-optical imaging layer of claim 21 wherein said at least two liquid crystal domains of different sizes comprise three liquid crystal domains of different sizes.

44. The electro-optical imaging layer of claim 21 wherein said binder comprises gelatin.

45. The electro-optical imaging layer of claim 44 wherein said layer further comprises a hardening agent.

46. The electro-optical imaging layer of claim 21 wherein said electro-optical imaging layer is coated and dried to a thickness of from 5 to 30 microns.

47. The electro-optical imaging layer of claim 21 wherein said imaging layer has a thickness 2 to 20 microns when dried.

48. The display of claim 21 wherein said electrically conductive layer a surface conductivity of less than $10^4$ ohms/sq.

49. The display of claim 21 wherein said at least one conductive layer is patterned with actinic radiation.

50. The display of claim 21 wherein said conductive layer comprises ITO.

51. The display of claim 21 wherein said conductive layer comprises polythiophene.

52. The display of claim 21 further comprising at least a second electrically conductive layer, wherein said electrically modulated imaging layer is between said first conductive layer and said second conductive layer.

53. A method of making a display comprising the steps of:
(a) providing an imaging layer comprising a binder having dispersed therein a blended mixture of at least two electrically modulated material domains of different uniform sizes, wherein the ratio of smallest to largest domain size for each of the electrically modulated material domains of different uniform sizes varies by no more than 1:2;
(b) coating said imaging layer over a substrate; and
(c) drying said imaging layer.

* * * * *